United States Patent
Belsley et al.

(10) Patent No.: US 10,557,942 B2
(45) Date of Patent: Feb. 11, 2020

(54) ESTIMATION OF MOTION USING LIDAR

(71) Applicant: DSCG SOLUTIONS, INC., Chantilly, VA (US)

(72) Inventors: Kendall Belsley, Falls Church, VA (US); Richard Sebastian, Frederick, MD (US)

(73) Assignee: DSCG Solutions, Inc., Frederick, MD (US)

(*) Notice: Subject to any disclaimer, the term of this patent is extended or adjusted under 35 U.S.C. 154(b) by 239 days.

(21) Appl. No.: 15/613,974

(22) Filed: Jun. 5, 2017

(65) Prior Publication Data

US 2018/0348372 A1   Dec. 6, 2018

Related U.S. Application Data

(60) Provisional application No. 62/346,866, filed on Jun. 7, 2016.

(51) Int. Cl.
   *G01C 3/08*    (2006.01)
   *G01S 17/58*   (2006.01)
   *G01S 17/08*   (2006.01)
   *G01S 7/481*   (2006.01)

(52) U.S. Cl.
   CPC ............ G01S 17/58 (2013.01); G01S 7/4817 (2013.01); G01S 17/08 (2013.01)

(58) Field of Classification Search
   CPC .......... G01S 17/66; G01S 17/42; G01S 17/58; G01S 17/89; G01S 7/4815; G01S 7/4817; G01S 17/08
   See application file for complete search history.

(56) References Cited

U.S. PATENT DOCUMENTS

| | | |
|---|---|---|
| 6,246,468 B1 | 6/2001 | Dimsdale |
| 6,937,774 B1 | 8/2005 | Specht et al. |
| 9,188,676 B2 | 11/2015 | Zheleznyak |
| 2005/0182518 A1 | 8/2005 | Karlsson |
| 2010/0017128 A1 | 1/2010 | Zeng |
| 2010/0109938 A1 | 5/2010 | Oswald et al. |
| 2010/0208234 A1 | 8/2010 | Kaehler |
| 2012/0289826 A1 | 11/2012 | Graumann et al. |
| 2013/0332112 A1 | 12/2013 | Nakamura |
| 2014/0368493 A1 | 12/2014 | Rogan et al. |
| 2015/0160332 A1 | 6/2015 | Sebastian et al. |
| 2017/0146656 A1 | 5/2017 | Belsley et al. |

OTHER PUBLICATIONS

International Search Report and Written Opinion received for PCT Patent Application No. PCT/US2017/036152, dated Aug. 21, 2017, 12 pages.

*Primary Examiner* — Samantha K Abraham
(74) *Attorney, Agent, or Firm* — Brake Hughes Bellermann LLP

(57) ABSTRACT

Techniques of tracking an object's motion involve using a LIDAR system that is configured to track an object over a period of time in which the object is moving using a single scanning motion. Using the LIDAR system, tracking of the object can be performed while eliminating visible imaging hardware (e.g., video camera hardware). Accordingly, the LIDAR system can be configured to operate in total darkness, into the sun, etc. The LIDAR system can be less susceptible to motion of the object than conventional systems. Accordingly, the motion of the object 110 be determined in some implementations solely from LIDAR measurements, without, for example, video.

20 Claims, 9 Drawing Sheets

306

```
┌─────────────────────────────────────────┐
│ Acquire dense sampling of object        │
│ displacements at time T₀ via interpolation │
│                                    702  │
└─────────────────────────────────────────┘
                    ↓
┌─────────────────────────────────────────┐
│ Form 2D function of translations Δx and │
│ Δy from displaced dense sampling of     │
│ object displacements at time T₂         │
│                                    704  │
└─────────────────────────────────────────┘
                    ↓
┌─────────────────────────────────────────┐
│ Find translations Δx₀ and Δy₀ that      │
│ minimize sum of squared differences     │
│ between object displacements at         │
│ time T₀ and time T₂                     │
│                                    706  │
└─────────────────────────────────────────┘
                    ↓
┌─────────────────────────────────────────┐
│ Form 1D function of rotation θ from     │
│ displaced dense sampling of object      │
│ displacements at time T₂                │
│                                    708  │
└─────────────────────────────────────────┘
                    ↓
┌─────────────────────────────────────────┐
│ Find rotation θ₀ that minimizes sum of  │
│ squared differences between object      │
│ displacements at time T₀ and time T₂    │
│                                    710  │
└─────────────────────────────────────────┘
                    ↓
┌─────────────────────────────────────────┐
│ Determine velocities vₓ and v_y and     │
│ rotational velocity ω_z based on        │
│ Δx₀, Δy₀, and θ₀ at time T₁             │
│                                    712  │
└─────────────────────────────────────────┘
```

FIG. 7

ESTIMATION OF MOTION USING LIDAR

RELATED APPLICATIONS

This application claims priority to U.S. Provisional Patent Application No. 62/346,866, filed Jun. 7, 2016, entitled "Estimation of Motion Using LIDAR."

TECHNICAL FIELD

This description relates to systems and methods for estimation of motion using Light Detection And Ranging (LIDAR).

BACKGROUND

In some known systems, objects may be tracked using a laser Light Detection And Ranging (LIDAR) system in conjunction with a video system. Some such known systems may be complex and difficult to use. Additionally, in some such known systems, the video system may require light in order to detect the object to be tracked. Thus, a need exists for systems, methods, and apparatus to address the shortfalls of present technology and to provide other new and innovative features.

BRIEF DESCRIPTION OF THE DRAWINGS

FIG. 7 is a flowchart illustrating an example method of determining initial estimates of object velocity and rotational velocity within the electronic environment illustrated in FIG. 1.

DETAILED DESCRIPTION

Figure 1:
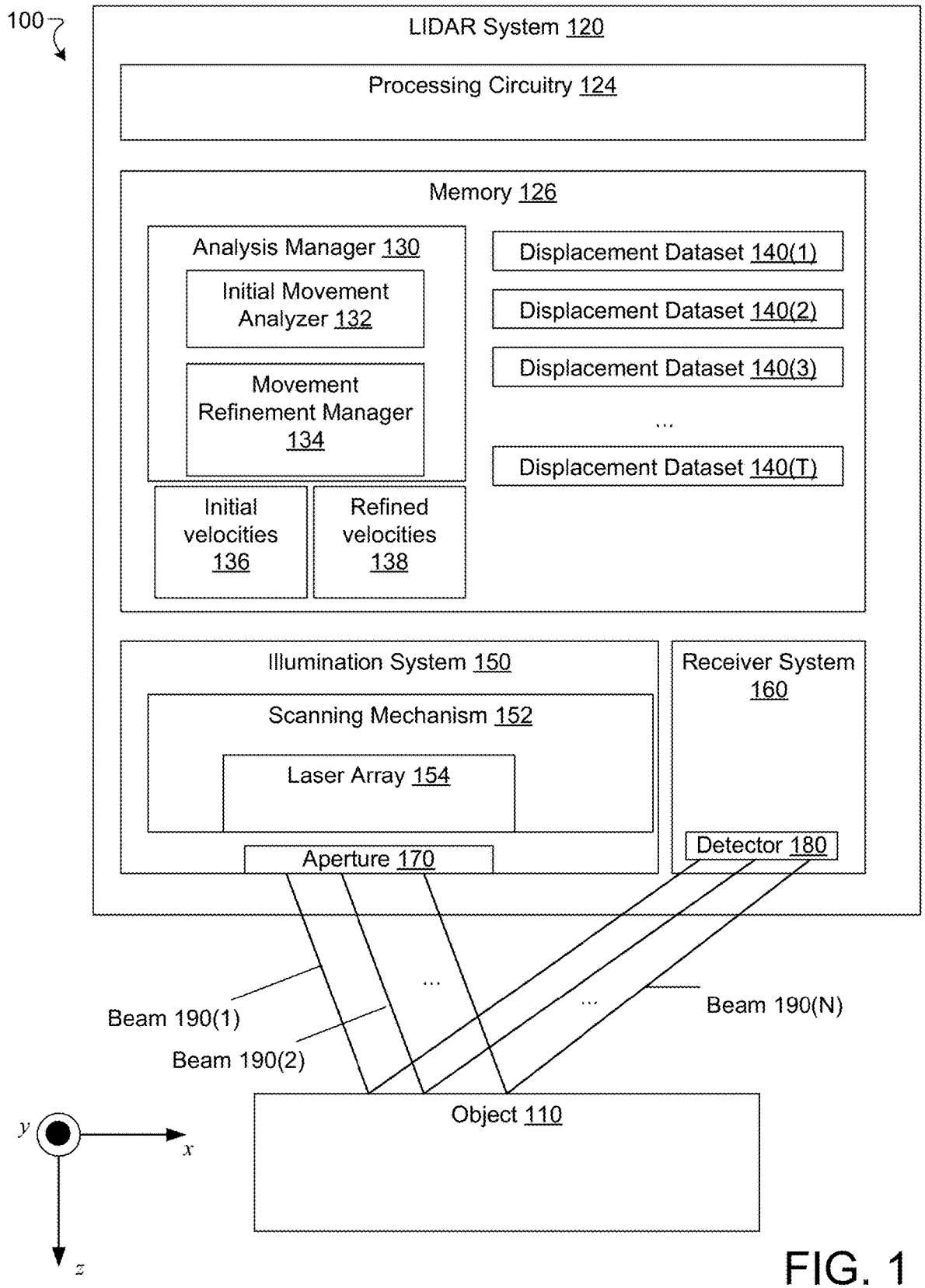
FIG. 1 is a block diagram illustrating an example LIDAR system within an electronic environment in which improved techniques described herein may be performed.

FIG. 1 is a diagram that illustrates an example electronic environment 100 in which improved techniques of tracking an object's motion are performed. The electronic environment 100 includes a LIDAR system 120 that is configured to track an object 110 over a period of time in which the object 110 is moving using a single scanning motion. Using the LIDAR system 120 tracking of the object 110 can be performed while eliminating visible imaging hardware (e.g., video camera hardware). Accordingly, the LIDAR system 120 can be configured to operate in total darkness, into the sun, etc. The LIDAR system 120 can be less susceptible to motion of the object 110 than conventional systems. Accordingly, the motion of the object 110 can be determined in some implementations solely from LIDAR measurements, without, for example, video.

The object 110 is assumed herein to be a rigid body of some unknown shape. For example, the object 110 may be a human face. The object 110 is assumed to be in motion, both linear and rotational, about an arbitrary axis. For a rigid body, the time-dependent linear velocity $v$ and time-dependent rotational velocity $\omega$ at a point r on the object 110 are related as follows:

$$v = \omega \times r + v_f \quad (1)$$

where × denotes a cross-product and $v_f$ is the velocity of a reference frame that contains the origin. In the examples provided herein, the reference frame is taken to be the inertial frame of the LIDAR system 120 although this is by no means a requirement.

It should be understood that in the electronic environment shown in FIG. 1, there is a natural axis of symmetry that is seen to be substantially along the beams emitted by the LIDAR system 120. In this case and in light of Eq. (1), we may decompose the motion of the object 110 into lateral and axial components. That is, given an axis of symmetry in the z direction, we may define the lateral motion using the components $v_x$, $v_y$, $\omega_z$ and the axial motion using the components $v_z$, $\omega_x$, $\omega_y$. In many situations, the lateral motion and axial motion are approximately independent. It is the primary objective of the improved techniques described herein to determine the lateral components of the object's motion. Axial motion of the object may be removed, or compensated for, directly from the LIDAR range and velocity measurements.

As shown in FIG. 1, the LIDAR system 120 is a single, integrated unit that includes processing circuitry 124, memory 126, an illumination system 150, and a receiver system 160. In some arrangements, the LIDAR system 120 takes the form of a handheld unit that may be pointed at the object 110. However, in other arrangements the components of the LIDAR system 120 may be distributed among different units (e.g., the processing circuitry 124 and memory 126 might be in a computing device separate from a handheld device that includes the illumination system 150 and the receiver system 160).

The processing circuitry 124 includes one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some arrangements, one or more of the components of the LIDAR system 120 can be, or can include, processors configured to process instructions stored in the memory 126. For example, an analysis manager 130 (and/or a portion thereof), shown as being included within the memory 126 in FIG. 1, can be a combination of a processor and a memory configured to execute instructions related to a process to implement one or more functions.

The analysis manager 130 is configured and arranged to produce estimates of the linear velocity components $v_x$, $v_y$ and rotational velocity $\omega z$ of the object 110 over the period of time in which the object 110 is tracked. The analysis manager 130 is configured to perform such an estimate in two stages. First, at a given time, the analysis manager 130, via an initial movement analyzer 132, performs an initial estimate of the lateral motion of the object 110 using a pair of displacement datasets, e.g., 140(1) and 140(2) centered about that time. Then the analysis manager 130, via a movement refinement manager 134, refines the initial estimate using actual data collection times and, if necessary, subsequent displacement datasets, e.g., 140(3) and so on.

The initial movement analyzer 132 is configured to produce initial velocity data 136, i.e., $v_x$, $v_y$, $\omega_z$ from displacement datasets 140(1) and 140(2). However, it should be appreciated that these initial data 136 are first estimates and may be refined using actual data collection times and, if necessary, subsequent displacement datasets, e.g., 140(3) and so on. In this capacity, the movement refinement manager 134 is configured to compute refinements 138, i.e., $\delta v_x$, $\delta v_y$, $\delta \omega_z$ from the actual data collection times and, in some cases, the subsequent displacement datasets. Further, the movement refinement manager 134 is configured to determine when sufficient convergence has been achieved so that no more refinement computations are necessary.

Each of the displacement datasets, e.g., displacement dataset 140(1) includes an array of displacement values in the z-direction as a function of the Cartesian coordinates x and y at a respective time. It should be appreciated that although the object 110 as shown in FIG. 1 has a flat surface facing the LIDAR system 120, in reality the object 110 may include, e.g., a human face, a portion of a body, an inanimate object, etc., and as such has a complicated profile z=f(x,y) at any time t. Because the object 110 is assumed to be a rigid body, then the difference between the displacement profiles from one time to another is a combination of translations $\Delta x$, $\Delta y$ and rotations $\theta_z$ (i.e., no deformations). The analysis manager 130 then finds the velocities and rotational velocities from these translations and rotations.

The illumination system 150 is configured and arranged to produce the illumination that is reflected from the object 110 in the act of generating the displacement datasets 140(1), . . . , 140(T). As shown in FIG. 1, this illumination takes the form of multiple beams 190(1), . . . , 190(N) of radiation directed along the z-axis. It should be appreciated that, although the beams 190(1), . . . , 190(N) as shown in FIG. 1 are directed at an angle with respect to the z-axis, in reality the beams travel substantially along the z-axis and the angles in the figure are exaggerated. The illumination system 150 includes a scanning mechanism 152, which includes a laser array 154, and an aperture 170.

The scanning mechanism 152 is configured and arranged to move the laser array 154 in a scanning motion. As shown in FIG. 1, the scanning mechanism 152 is configured to move each laser in the laser array 154 back and forth along they direction, i.e., orthogonally to the direction of the beams 190(1), . . . , 190(N). However, in some arrangements the scanning may be performed along the x-direction instead or in addition. The scanning mechanism 152 moves the laser array 154 altogether, so that all scans are performed in one scanning motion. Further, it should be appreciated that each individual scan in one direction is performed at a sufficient speed so as to be considered as having taken place in a single time instant. Along these lines, a first scan of the laser array 154 in the positive y-direction might be considered to have taken place at an instant of time T0, even though data from the first point in the scan and the past point in the scan are not received simultaneously at the LIDAR system 120.

The laser array 154 is configured and arranged to produce an array of beams (e.g., beams 190(1), . . . , 190(N)) of laser radiation, i.e., substantially coherent, quasi-monochromatic light. In many arrangements, the laser array 154 includes a rectangular array of lasers, each producing laser radiation at some wavelength. Each laser in the rectangular array corresponds to a sample point on the object 110 where the beam produced by that laser reflects off the object 110. In other arrangements, the array of beams 190(1), . . . , 190(N) is generated using a single laser (not shown) that is fiber coupled and split into multiple fibers (not shown) which are then arranged into a fiber-emitter array.

In some arrangements, the wavelength of the light in each beam 190(1), . . . , 190(N) produced by the laser array 154 is 1550 nm. This wavelength has the advantage of being suited to objects that are, for example, human faces. Nevertheless, other wavelengths (e.g., 1064 nm, 532 nm) may be used as well.

The aperture 170 is configured to pass the beams 190(1), . . . , 190(N) generated by the laser array 154 out of the LIDAR system 120 to the object 110. In some arrangements the aperture 170 may simply be an opening to let the beams 190(1), . . . , 190(N) pass through. In other arrangements, the aperture 170 may include optics (not shown) for satisfying certain specifications (e.g., spot size on object).

The receiver system 160 is configured and arranged to receive the beams reflected from the object 110 and generate the displacement datasets 140(1), . . . , 140(T) from the received beams. The receiver system 160 may generate the displacement datasets 140(1), . . . , 140(T) using any number of known techniques (e.g., heterodyne detection) and will not be discussed further. The receiver system includes a detector 180 that is configured and arranged to convert the received beams into electrical signals from which the receiver system 160 may generate the displacement datasets 140(1), . . . , 140(T). In some arrangements, the detector 180 includes a photomultiplier tube (PMT) or an array of charge-coupled devices (CCDs).

Figure 2A:
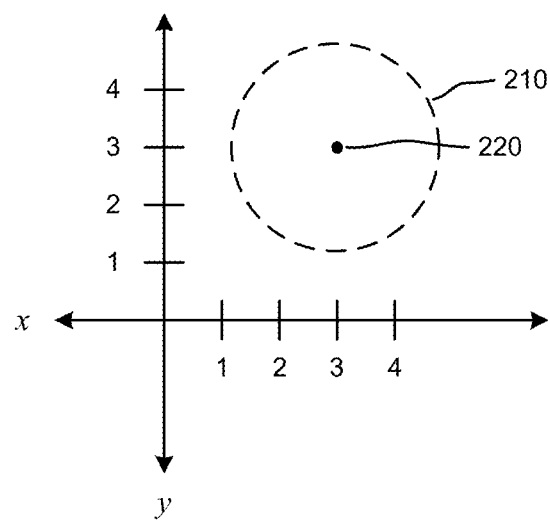
FIG. 2A is a diagram illustrating an example object being tracked within the electronic environment illustrated in FIG. 1.
Figure 2B:
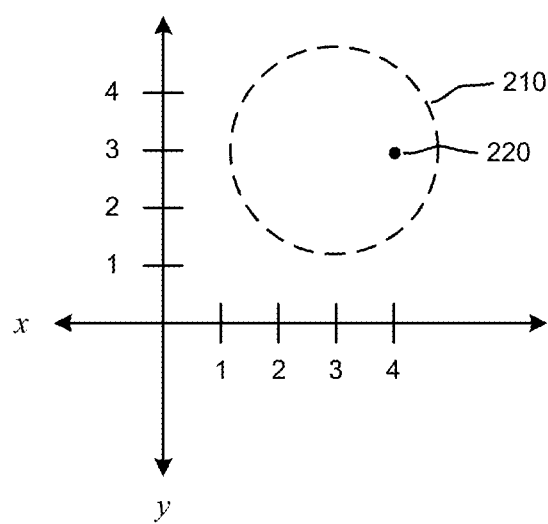
FIG. 2B is a diagram illustrating the example object as tracked within the electronic environment illustrated in FIG. 1.

FIGS. 2A and 2B illustrate an example object 210 that may be observed by (e.g., targeted by) the LIDAR system 120. The object 210 may have any shape, but is represented in FIGS. 2A and 2B as a circle. In FIG. 2A, at time T1 a point 220 on the object 210 is being observed by the LIDAR system 120. At time T1 the point 220 is located at (3,3) in the (x,y) plane. As illustrated in FIG. 2B, at time T2 the point 220 is located at (4,3) in the (x,y) plane. The movement of the point may be the result of different types of movements of the object 80. For example, the object 220 may have moved from one location to another (translational movement) or the object 220 may have rotated (for example, about an axis parallel to the y axis of the x-y plane).

Figure 2C:
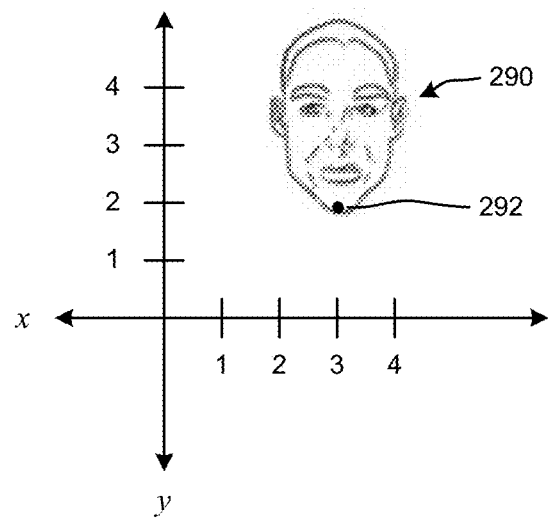
FIG. 2C is a diagram illustrating another example object being tracked within the electronic environment illustrated in FIG. 1.
Figure 2D:
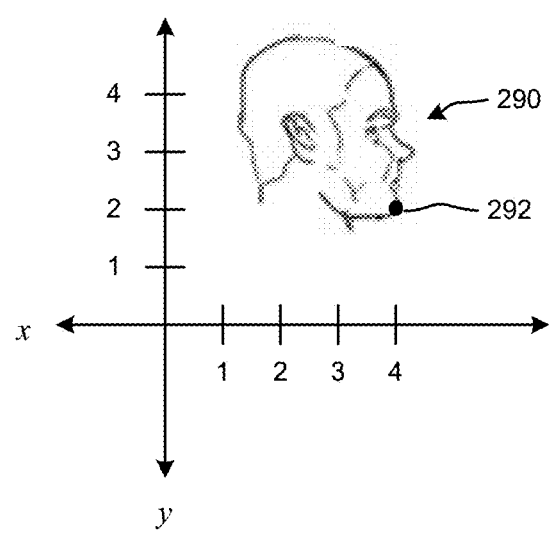
FIG. 2D is a diagram illustrating the other example object as tracked within the electronic environment illustrated in FIG. 1.
Figure 2E:
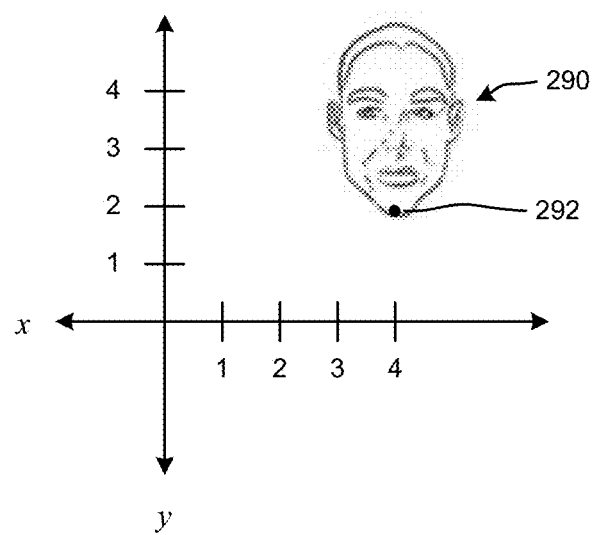
FIG. 2E is a diagram illustrating the other example object as further tracked within the electronic environment illustrated in FIG. 1.

As illustrated in FIGS. 2C, 2D, and 2E a head or face 290 of an individual may be tracked or observed by the LIDAR system 120. Specifically, a point or location 292 of the head or face 290 may be observed. As illustrated in FIG. 2C, at time T1 the point 292 is located at (3,2) in the (x,y) plane. At time T2 the point 292 may be observed to be at (4,2). The movement of the point may be the result of different types of motion. For example, the person or individual may have rotated their head (for example, about an axis parallel to they axis), as illustrated in FIG. 2D. Alternatively, the person or individual may have moved their head (without any rotation), as illustrated in FIG. 2E.

Figure 3:
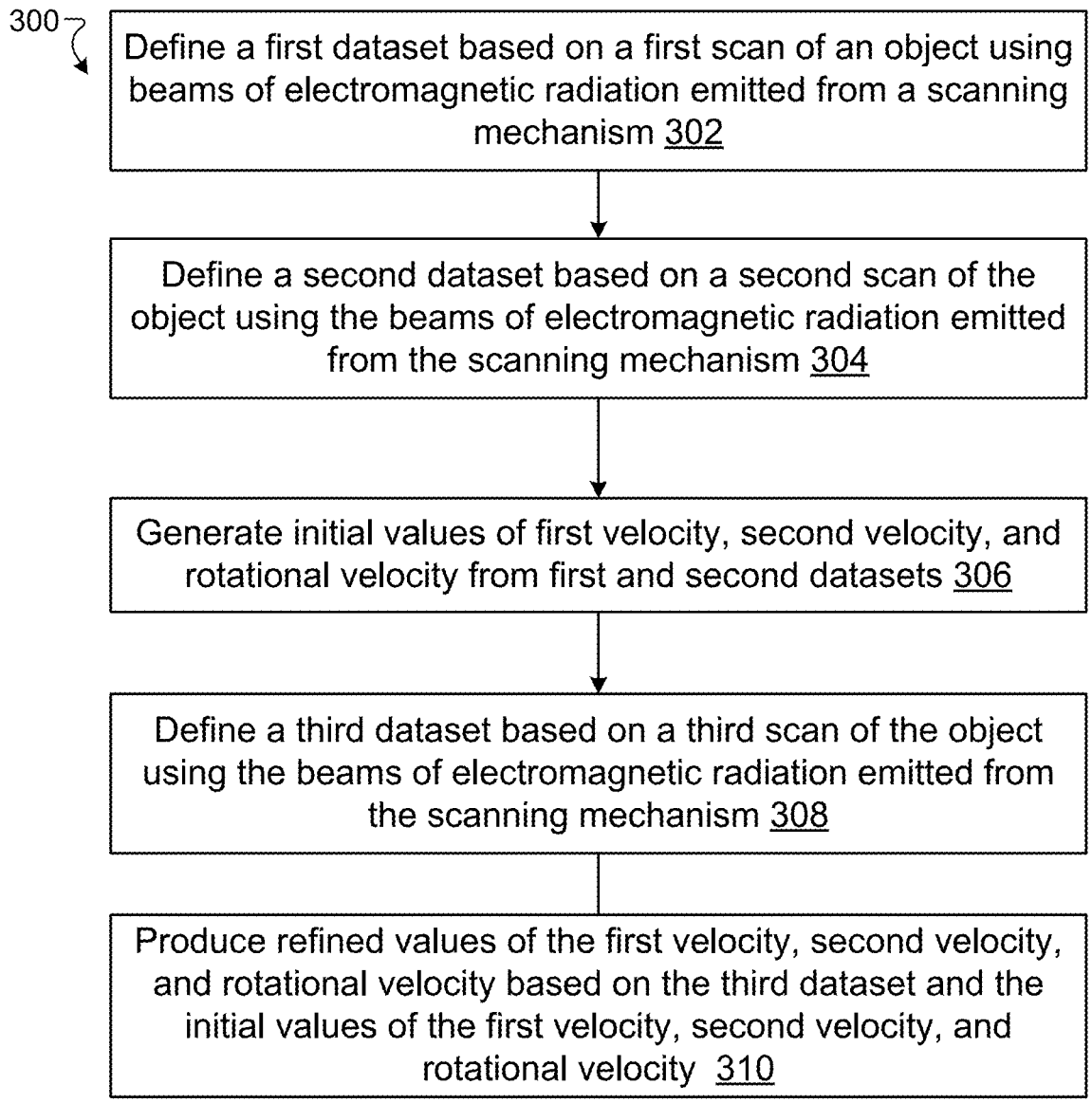
FIG. 3 is a flowchart illustrating an example method for calculating object velocities and rotational velocity using a single set of scans.

FIG. 3 illustrates an example method 300 of performing the improved technique described herein. The method 300 may be performed by constructs described in connection with FIG. 1, which can reside in memory 126 of the LIDAR system 120 and can be executed by the processing circuitry 124.

At 302, a LIDAR system defines a first dataset based on a first scan of an object using beams of electromagnetic radiation emitted from a scanning mechanism. For example, the LIDAR system 120, via scanning mechanism 152, scans beams of light 190(1), . . . , 190(N) over the object 110 at a point in time. The LIDAR system 120, via receiver system 160, receives the beams 190(1), . . . , 190(N) and generates the displacement dataset 140(1) from the received beams.

At 304, the LIDAR system defines a second dataset based on a second scan of the object using the beams of electromagnetic radiation emitted from the scanning mechanism. For example, the LIDAR system 120, via scanning mechanism 152, scans beams of light 190(1), . . . , 190(N) over the object 110 at a second point in time. The LIDAR system 120, via receiver system 160, receives the beams 190(1), . . . , 190(N) and generates the displacement dataset 140(2) from the received beams.

It should be understood that the scan performed by the LIDAR system 120 at the second point in time may be the next scan, i.e., the reverse scan to the first scan. However, in other arrangements the scan performed at the second point in time is the next scan in the same direction as the first scan. In some implementations, such a situation may be preferable because there may be a better correlation between the displacement datasets when the first and second scans are performed in the same direction. However, in other situations, it may be preferable to consider a scan in the reverse direction as the second scan.

At 306, the LIDAR system generates initial values of a first velocity (e.g., $v_x$), a second velocity (e.g., $v_y$), and a rotational velocity (e.g., $\omega_z$) from the first dataset and the second dataset. When the first and second scans are performed in the same direction, these velocities and rotational velocity are evaluated at the time of the scan in between the first scan and second scan (i.e., the one in the opposite direction). Details of how the LIDAR system 120 generates these values are discussed in reference to FIG. 7.

At 308, the LIDAR system defines a third dataset based on a third scan of the object using the beams of electromagnetic radiation emitted from the scanning mechanism. For example, the LIDAR system 120, via scanning mechanism 152, scans beams of light 190(1), . . . , 190(N) over the object 110 at a third point in time. The LIDAR system 120, via receiver system 160, receives the beams 190(1), . . . , 190(N) and generates the displacement dataset 140(3) from the received beams. Again, the third scan may either be the scan following the second scan or the next scan in the same direction as the second scan but is preferred to be in the same direction.

At 310, the LIDAR system produces refined values of the first velocity, second velocity, and rotational velocity based on the initial values of the first velocity, second velocity, and rotational velocity and actual data collection times and, if necessary, the third dataset. Again, the refinements are performed for the velocities and rotational velocity at the time in between the first scan and second scan. Details of how the LIDAR system 120 generates these refined values are discussed in connection with at least FIG. 8.

Figure 4:
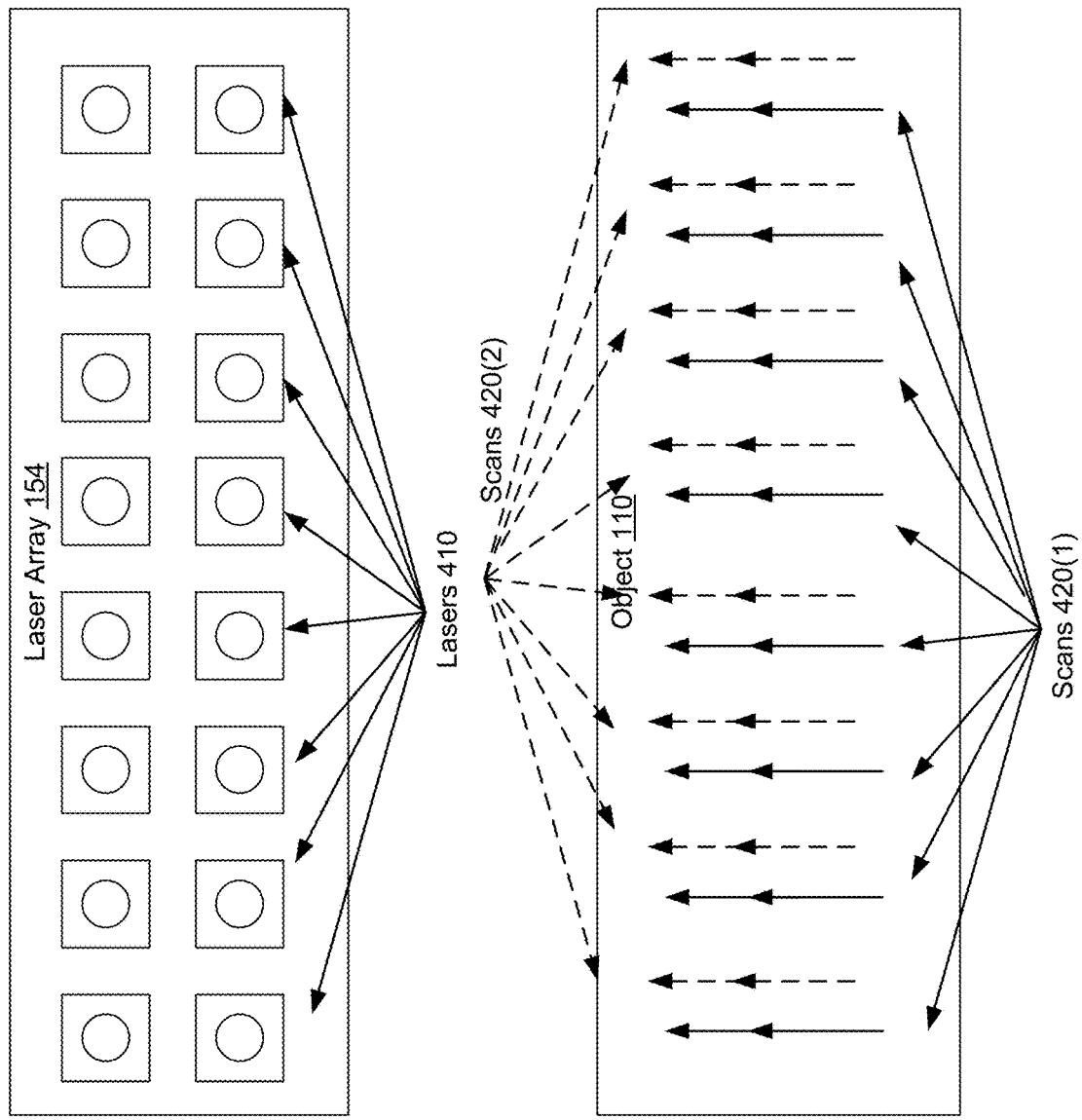
FIG. 4 is a diagram illustrating an example scan of an object over time within the electronic environment illustrated in FIG. 1.

FIG. 4 illustrates a top-down view of an example scan geometry using the LIDAR system 120 resulting from an example laser array 154. In this case, the laser array 154 contains 16 lasers arranged in a two-by-eight array. This configuration of the laser array 154 as shown in FIG. 4 is only an example and many configurations using any number of lasers (e.g., 2×4, 2×6, 3×4, 2×6, 2×8, 3×8, 4×4, and so on) may be used.

As stated previously with reference to the example environment of FIG. 1, the scanning mechanism 152 is configured to move the laser array 154 as a whole during a scan. Each laser in the laser array 154 thus scans the object 110 synchronously and in the same direction. The scan path traced out by the scanning mechanism 152 may be any pattern but for simplicity is taken to be along a straight line along one axis (the y-axis as shown in FIG. 4).

Such a linear scan pattern performed by the scanning mechanism 152 produces the scan lines 420(1) over the object 110 shown in FIG. 4. It should be appreciated that, as a first approximation, the scans producing scan lines 420(1) are considered to have taken place at a single time instant T0 even though the scan time across the object 110 is finite. In refining the first approximation, a finite scan time may be taken into account.

It should also be appreciated that scan lines of beams produced by lasers of the laser array 154 in the same column may overlap. This is shown in FIG. 4 as each scan line 420(1) is actually two overlapping scan lines. In some implementations, this overlap occurs because the extent of a scan performed by the scanning mechanism 152 is longer than the distance between the lasers in each column of the laser array 154.

Because the object 110 is in motion, the scan lines of the next scan appear on a different location on the object 110. In FIG. 4, the scan lines 420(2) are produced from scans at a time T2, i.e., the time of the next scan in the same direction. The scan lines 420(2) are shown in FIG. 4 as dashed to distinguish over the scan lines 420(1). Again, each scan line 420(2) is actually two overlapping scan lines.

Figure 5:
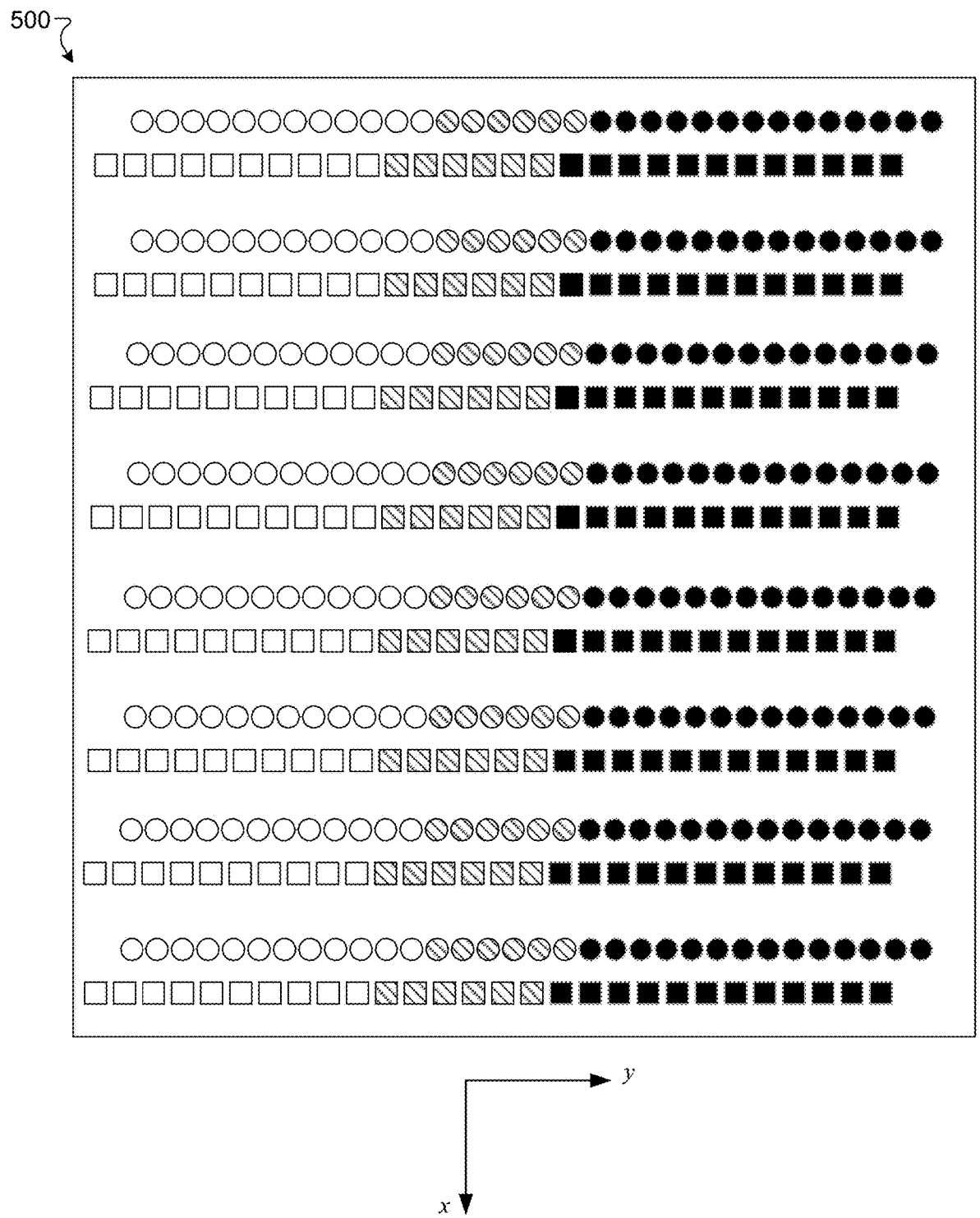
FIG. 5 is a diagram illustrating an example sampling of object displacements from the scan illustrated in FIG. 4.

FIG. 5 illustrates a data sampling 500 based on the scanlines shown in FIG. 4. Note that the axes as depicted in FIG. 5 are rotated with respect to the axes depicted in FIG. 4, and the scan direction in FIG. 5 is horizontal. The data sampling 500 represents what is stored in the memory 126 after the beams 190(1), . . . , 190(N) have been received at the detector and before the displacement datasets 140(1), . . . , 140(T) have been generated. Note that the sample points depicted in FIG. 5 are in the reference frame of the object and not that of the LIDAR system 120. Each small circle represents a displacement of the surface of the object 110 in the z-direction at the time T0, i.e., during the first scan in the positive y-direction. Each small square represents a displacement of the surface of the object 110 in the z-direction at the time T2, i.e., during the second scan in the positive y-direction. The filling of each circle or square represents the beam produced by the first or second laser in each column of the laser array 154. It should be appreciated that there is overlap between the two beams along the center of each scanline and this is represented by cross-hatching in FIG. 5.

It should also be appreciated that, due to lateral movement of the object 110, the extents of the first scan and the second scans differ. For example, while the first scanlines may occupy a range between 10 cm and 200 cm along the y-direction, the second scanlines may occupy a range between 0 cm and 190 cm along the y-direction. Again, the reference frame used to define the origin of the coordinate system is the inertial frame of the LIDAR system 120.

It should further be appreciated that the sampling along the x-direction is typically very sparse. While the number of samples taken along the y-direction may be as large or small as necessary, the number of samples along the x-direction is limited by the number of lasers in a row of the laser array 154. In the case shown in FIG. 5, while there are a few dozen samples and there may be hundreds of such samples along the scan direction, there may be only eight samples normal to the scan direction.

The gathering of the data represented in FIG. 5 can be used to compute an initial estimate of the lateral linear velocities $v_x$, $v_y$ and the lateral rotational velocity $\omega_z$. This is achieved by computing an estimate of the translations $\Delta x$, $\Delta y$ and rotation $\theta_z$ between the dataset at time T0 and the dataset at time T2. It should be appreciated that, although only lateral motion is considered here, there still may be some axial displacement between time T0 and time T2. However, this displacement may be removed, or compensated for, using the LIDAR range and velocity data from T0, T1 and T2.

In some implementations, before proceeding with the estimates, it may be observed that the raw data are too sparsely sampled to provide a meaningful covering of the object. In order to provide the flexibility needed to compute small translations and rotations, in some implementations, it may be advantageous to resample the datasets. For example, by introducing an interpolation scheme that produces a dense grid, the initial estimates of the translations and rotation may be found with relative ease.

Figure 6:
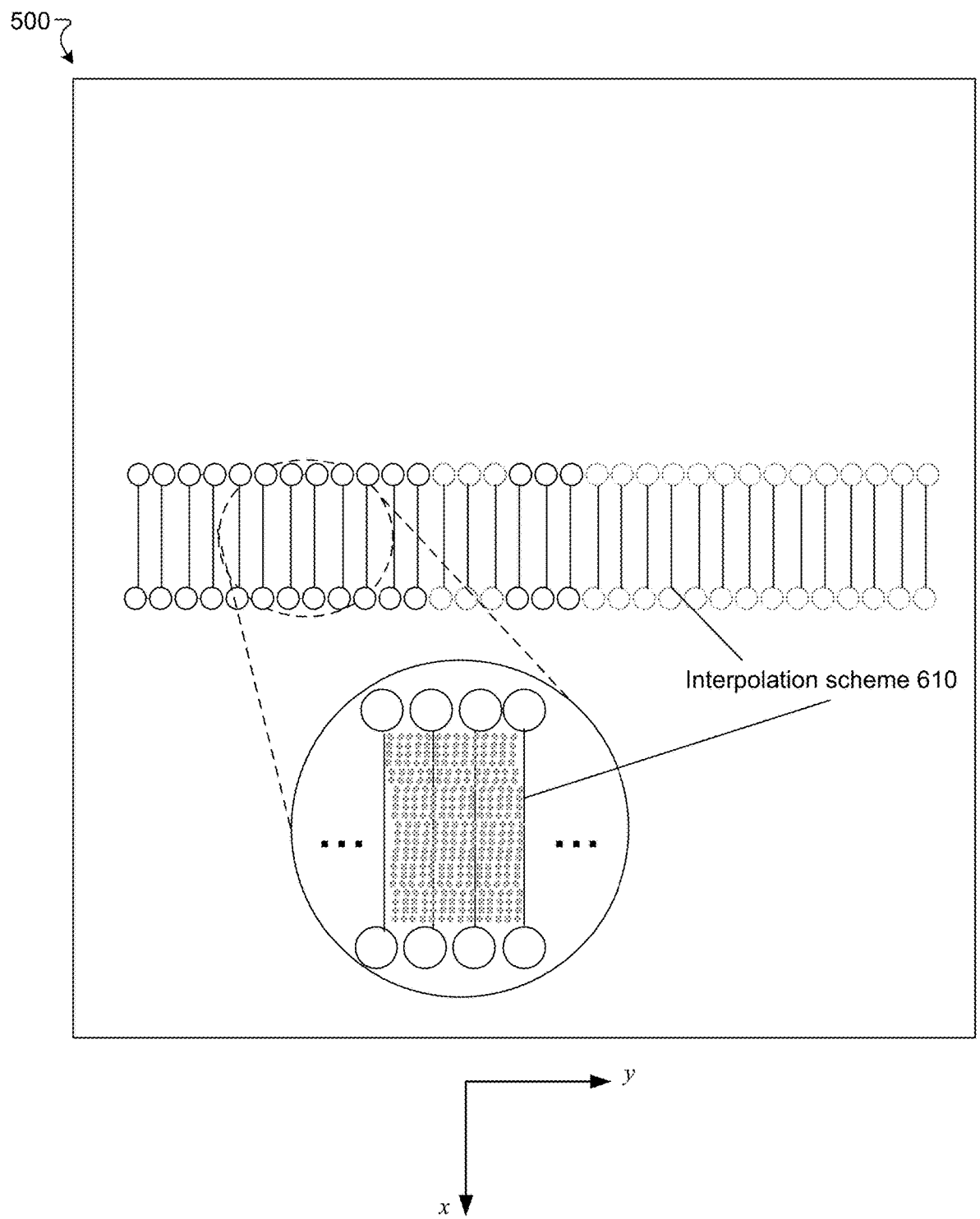
FIG. 6 is a diagram illustrating an example interpolation of the object displacements from the sampling illustrated in FIG. 5.

FIG. 6 illustrates an example of such an interpolation scheme 610. FIG. 6 shows two columns of a scanline from FIG. 5 with a triangular grid drawn between the sample points of the columns. Thus, each sample point is a vertex of two triangles in the grid. Within each triangular area, one may define a respective linear interpolation function using, e.g., barycentric or rectangular coordinates.

However, it should be appreciated that the interpolation scheme 610 can be used to define interpolated object displacement as a continuous function of coordinates within a triangular region. In this way, finding the translations and rotation can be achieved. For example, one may determine a correlation between the two datasets at T0 and T2 as a function of translation and/or rotation. The initial estimated translations and rotation may then be those values that maximize the correlation between the datasets. Along these lines, maximizing the correlation between the datasets in one implementation means minimizing a sum of squared differences between interpolated object displacement values over translation and/or rotation. Further details are discussed with reference to FIG. 7.

FIG. 7 illustrates further detail of element 306 of method 300 shown in FIG. 3, in which the LIDAR system 120 generates initial values of a first velocity (e.g., $v_x$), a second velocity (e.g., $v_y$), and a rotational velocity (e.g., $\omega_z$) from the first dataset and the second dataset.

At 702, a LIDAR system 120 acquires a dense sampling of object displacements at time T0 via interpolation. A dense sampling is a sampling of object displacements a factor of two or more dense than that of the original datasets, e.g., if a raw data set has 200×8 data points, then the dense sampling acquired via interpolation may be 800×800 or higher. For example, in one implementation the LIDAR system 120 shown in FIG. 1 performs a linear interpolation as described with reference to FIG. using a manhattan grid on displacement dataset 140(1). A result of this interpolation is a dense sampling of object displacements over a rectangular grid for the dataset at time T0. It has been found that the interpolation over the manhattan grid as depicted in FIG. 6 results in faster computation time than schemes that use a nearest neighbor approximation.

At 704, the LIDAR system 120 then forms a dense sampling of object displacements at time T2 (e.g., displacement dataset 140(2)) to create an interpolated dataset that is a function of object displacements $\Delta x$, $\Delta y$. In one implementation, the LIDAR system 120 considers $(\Delta x, \Delta y)=(0,0)$ as the interpolated sample points at T2 having at the same coordinates as the interpolated sample points at T0. Using the interpolation function defined by the second dataset, the LIDAR system 120 computes interpolated object displacements corresponding to each interpolated sample point at time T0 but shifted by translations $\Delta x$, $\Delta y$ in each respective direction. In some arrangements, the shifting may be done in only one direction.

If $f_0(x,y)$ represents the object displacements at time T0 and $f_2(x,y)$ represents the object displacements at time T2, then for each sample point $(x_i, y_j)$ in the dense (interpolated) grid, the LIDAR system 120 forms the function $f_2(x_i+\Delta x, y_j+\Delta y)$, which is considered a function of $\Delta x$ and $\Delta y$.

At 706, the LIDAR system 120 determines values of $\Delta x$ and $\Delta y$ that optimize a correlation between the interpolated dataset at T0 and the interpolated dataset at T2. In some implementations, optimizing a correlation involves minimizing, or substantially reducing, a sum over squared differences between the displacements at T0 and the translated displacements at T2. In other words, the LIDAR system 120 may find the values of $\Delta x$ and $\Delta y$ that minimize the following quantity:

$$E_{trans}(\Delta x, \Delta y) = \sum_{i=1}^{K}\sum_{j=1}^{L} [f_2(x_i+\Delta x, y_j+\Delta y) - f_0(x_i, y_j)]^2, \qquad (2)$$

where K and L are the number of interpolated sample points in the x and y-direction, respectively. It should be appreciated that the interpolated sample points $x_i$ and $y_j$ are not necessarily on a rectangular grid. The LIDAR system 120 may use any method known in the art to perform the minimization of $E_{trans}(\Delta x, \Delta y)$. The values that minimize this function are denoted $(\Delta x_0, \Delta y_0)$ and represent the initial estimates of the translation of the object at time T1 between time T0 and time T2.

At 708, the LIDAR system 120 forms another interpolation function from the dataset at time T2 based on rotation of a sample point through an angle $\theta_z$. It should be appreciated that the initial estimate of the rotation is determined independently from the initial estimate of the translation.

At 710, the LIDAR system 120 determines the value of the rotation $\theta_z$ that maximizes the correlation between the interpolated dataset at T0 and the interpolated dataset at T2. In some implementations, maximizing a correlation involves minimizing a sum over squared differences between the displacements at T0 and the translated displacements at T2. In other words, the LIDAR system 120 may find the value of $\theta_z$ that minimizes the following quantity:

$$E_{rot}(\theta_z) = \qquad (3)$$
$$\sum_{i=1}^{K}\sum_{j=1}^{L}[f_2(x_i \cos\theta_z - y_j \sin\theta_z, x_i \sin\theta_z + y_j \cos\theta_z) - f_0(x_i, y_j)]^2.$$

where $E_{rot}(\theta_z)$ is evaluated at discreet values of $\theta_z$ close to zero. The LIDAR system 120 may use any method known in the art to perform the minimization of $E_{rot}(\theta_z)$. The value that minimizes this function is denoted as $\theta_{z0}$ and represents the initial estimates of the rotation of the object at time T1 between time T0 and time T2.

At 712, the LIDAR system 120 determines the initial estimates at the time T1 of the velocities $v_x$, $v_y$, and rotational velocity $\omega_z$ based on the values $\Delta x_0$, $\Delta y_0$, and $\theta_{z0}$.

Figure 8:
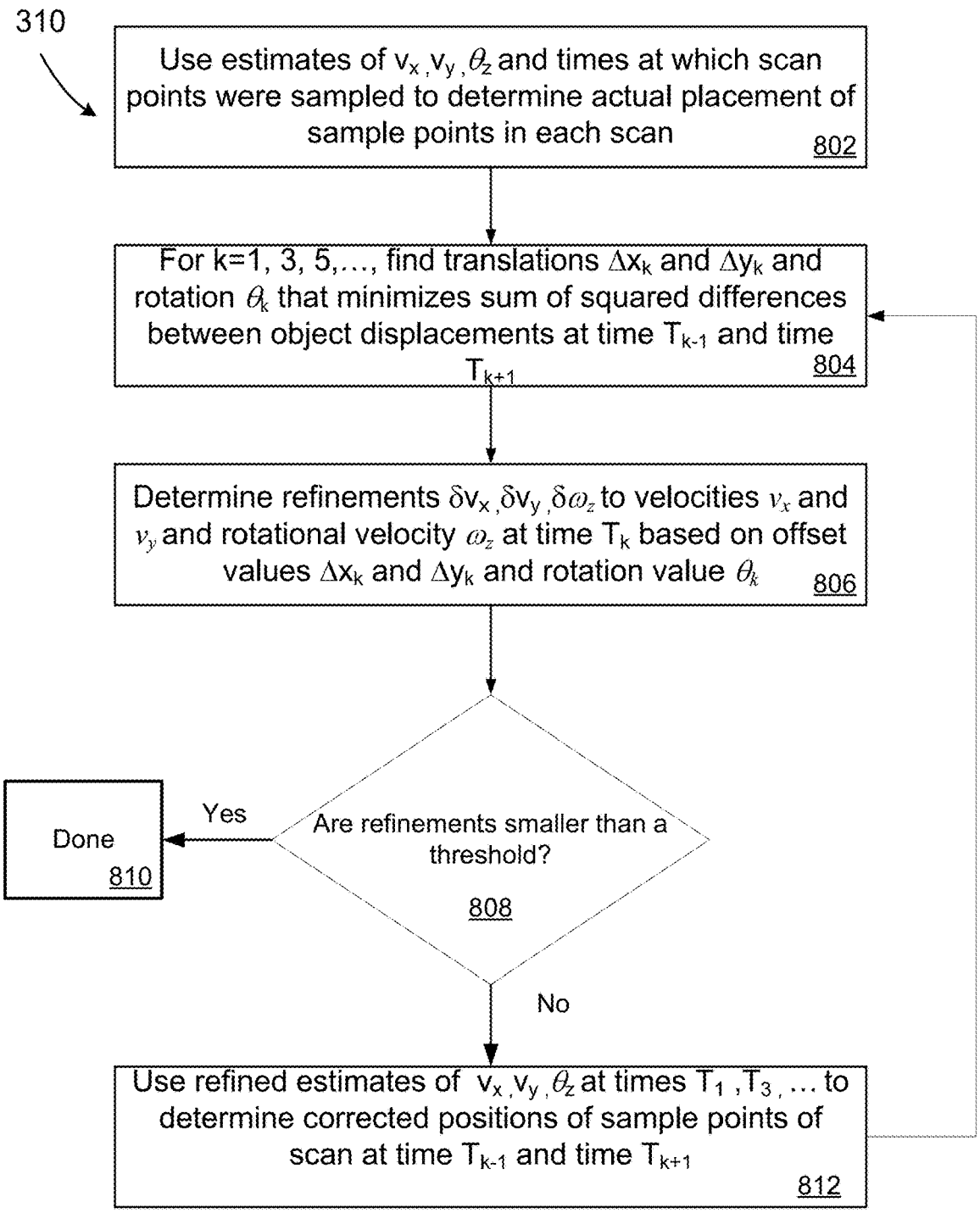
FIG. 8 is a flowchart illustrating an example method of refining the initial estimates of object velocity and rotational velocity determined by the process illustrated in FIG. 7.

FIG. 8 illustrates example detail of element 310 of method 300 shown in FIG. 3, in which the LIDAR system 120 produces refined values of the first velocity, second velocity, and rotational velocity at time T1 based on initial estimates of the first velocity, second velocity, and rotational velocity. In some implementations, the LIDAR system 120 also uses subsequent datasets and their respective velocity estimates to further refine these values of the first velocity, second velocity, and rotational velocity.

At 802, the LIDAR system 120 determines the actual positions of the sample points of the scan at T0 and T2 based on a scan speed. Along these lines, as discussed previously with respect to the initial estimate, it was assumed in making that estimate of the velocities that the sample points of a single scan were all taken at a single point in time. That is not true as the scan has a finite speed. Thus, the LIDAR system 120 performs the correction of the position of the sample points in the scan according to the time of the scan and based on the initial estimates of the velocities $v_x$, $v_y$, and rotational velocity $\omega_z$ at time T1.

As an example, suppose that the first scan corresponding to time T0 takes 10 milliseconds to complete. For the purposes of the initial estimate, the scan was considered to have taken place at T0=5 msec. Further suppose that a sample point $(x_i, y_j)$ of the scan is known to have been generated at T=1 msec. (For example, the sample points may have been generated at a uniform rate.) Then the linearly corrected (without rotation) sample point has a position equal to $(x_i', y_j') = (x_i + v_x \Delta T, y_j + v_y \Delta T)$, where $\Delta T = T0 - T$. The corrected sample point taking rotation into account has a position equal to $(x_i'', y_j'') = (x_i' \cos\theta_{z0} - y_j' \sin\theta_{z0}, x_i' \sin\theta_{z0} + y_j' \cos\theta_{z0})$. This latter position is the refined position of that sample point. This process of finding the refined positions of sample points continues for all sample points in the T0 and T2 scans.

At 804, once the refined positions of the sample points at T0 and T2 have been found, the LIDAR system 120 repeats 702, 704, and 706 from FIG. 7. Along these lines, the LIDAR system 120 finds translations and a rotation that maximizes a correlation between the interpolated object displacements at time T0 and time T2. In some implementations, the LIDAR system 120 minimizes or at least substantially reduces a sum of squared differences between the object displacements at various sample points in the xy-plane. The result of the minimization of the sum, i.e., the optimization of the correlation is a specification of new translations $\Delta x_1$, $\Delta y_1$, and rotation $\theta_{z1}$.

At 806, the LIDAR system 120 determines refinements $\delta v_x$, $\delta v_y$, and $\delta \omega_z$ to the linear and rotational velocities at time T1 from the new translations and rotation.

At 808, the LIDAR system 120 determines whether these refinements to the initial estimates of the velocities $v_x$, $v_y$, and rotational velocity $\omega_z$ are smaller than a threshold.

At 810, if the refinements are smaller than the threshold, then the process 310 has converged and the motion of the object 110 at time T0 has been determined.

At 812, if the refinements are not smaller than the threshold, then the process 310 has not converged and there are more refinements to the linear and rotational velocities. Along these lines, the LIDAR system 120 may determine the motion of the object 110 at subsequent (odd-numbered) times by using subsequent datasets taken at even times (e.g., T4, T6, etc.). In one implementation, suppose that the LIDAR system 120 has generated refined velocities $v_x$, $v_y$, and rotational velocity $\omega_z$ at time T3 based on refined positions of object sample points at times T2 and T4. Then the velocity may be considered to be a function of time. With two data points (velocity at T1 and T3), each velocity may be modeled using a linear profile: $v(T) = v(T1) + \alpha(T - T1)$, where the coefficient a is determined from the velocity at T1 and T3. This time-dependent model for each velocity will produce new adjusted values of the velocities at T0 and T2. From these new adjusted values of the velocities, the LIDAR system 120 may determine further refined positions of the sample points, from which new refinements to the velocities at T1 may be determined. If these refinements are not less than the threshold, then the LIDAR system 120 uses scan data at T6 to determine velocities at T5, from which a quadratic velocity model is generated, and so on until the refinements to the velocity are less than the threshold. It has been found that the above process converges rapidly.

The time-dependent velocities used for further refinement need not be a simple linear interpolation of the velocities in time. In some implementations, any more accurate interpolation of the velocity may be used, such as cubic spline, when more than two velocity estimates are known.

The components (e.g., modules, processors (e.g., a processor defined within a substrate such as a silicon substrate)) of the LIDAR system 120 (e.g., the analysis manager 130) can be configured to operate based on one or more platforms (e.g., one or more similar or different platforms) that can include one or more types of hardware, software, firmware, operating systems, runtime libraries, and/or so forth. In some implementations, the components of the LIDAR system 120 can be configured to operate within a cluster of devices (e.g., a server farm).

In some implementations, the second scan referred to in FIG. 3 may be performed in the opposite direction of the first scan. The velocities and rotational velocity so determined are evaluated, as before, at a time halfway between the first scan and second scan.

In some implementations, one or more portions of the components shown in the LIDAR system 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 120 can be, or can include, a software module configured for execution by at least one processor (not shown). In some implementations, the functionality of the components can be included in different modules and/or different components than those shown in FIG. 1.

In some implementations, one or more of the components of the LIDAR system 120 can be, or can include, processors configured to process instructions stored in a memory. For example, the analysis manager 130 (and/or a portion thereof) can be a combination of a processor and a memory configured to execute instructions related to a process to implement one or more functions.

Although not shown, in some implementations, the components of the LIDAR system 120 (or portions thereof) can be configured to operate within, for example, a data center (e.g., a cloud computing environment), a computer system, one or more server/host devices, and/or so forth. In some implementations, the components of the LIDAR system 120 (or portions thereof) can be configured to operate within a network. Thus, the LIDAR system 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the LIDAR system 120 may include a memory. The memory can be any type of memory such as a random-access memory, a disk drive memory, flash memory, and/or so forth. In some implementations, the memory can be implemented as more than one memory component (e.g., more than one RAM component or disk drive memory) associated with the components of the LIDAR system 120.

In some implementations, a LIDAR system includes a laser system that includes lasers or laser beams that are configured to move in a pattern or patterns with respect to the object that is being tracked. For example, in some implementations, the scanning mechanism 152 of the LIDAR system 120 includes a plurality of lasers or beams that are configured to move in a pattern or patterns with respect to the object being tracked.

For example, in some implementations, the LIDAR system 120 may have one mode in which the laser beams are fixed or stationary and a second mode in which the laser beams move in a pattern or patterns such as a shape. In some implementations, two or more of the laser beams move in a pattern or patterns when the LIDAR system 120 is in the second mode. In some implementations, different laser beams may move independently in different patterns.

In other implementations, the LIDAR system 120 includes some lasers or produces some laser beams that are stationary and some that are configured to move in a pattern (or patterns) or shape.

The lasers or beams can move in any pattern or shape. For example, in some implementations, the lasers or beams are configured to move in elliptical shape. In other implementations, the lasers or beams are configured to move in a line, circle, square, rectangle, triangle, or any other shape. In some implementations, the shape or pattern that the lasers or beams move in are dictated or determined by the object that is being tracked. For example, in some implementations, the pattern or shape of the laser movement may be similar to the shape of the object that is being tracked. For example, an elliptical shape or pattern may be used when tracking a face of an individual as the face of an individual is generally elliptical in shape.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In some implementations, the LIDAR system 120 may achieve millimeter range accuracy performance off moving faces of a subject or individual. However, in some implementations, solid object velocity estimation requires processing of multiples samples in order to remove significant velocity components from speech and other biological components. A 500 Hz vibration with an amplitude of 0.05 mm (50 microns) will have a maximum velocity of (2*π*500*5E−5=0.157 m/sec) about 16 cm/sec. Even though the amplitude of the vibration is an insignificant range change for the process of tracking faces of a subject or individual, the instantaneous velocity may be significant and the vibrational velocity may be removed. In some implementations, removing vibrational velocity may require processing a velocity data sample significantly longer than the periods of the vibrations to be removed and care to avoid noise or bias. For example, noise in the velocity (for example, velocity in the z direction) can affect or degrade the ability to detect or determine the rotation of the object or the z velocity of the object. In some implementations, the vibration or velocity noise is relatively small and can be averaged out to remove its effects.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What may be claimed is:

1. A method, comprising:
    defining a first dataset based on a performance of a first scan at a first time of an object using a plurality of beams of electromagnetic radiation emitted from a scanning mechanism;
    defining a second dataset based on a performance of a second scan at a second time of the object using the plurality of beams of electromagnetic radiation emitted from the scanning mechanism, each of the first scan and the second scan being performed in a direction substantially normal to a direction of the plurality of beams;
    generating, based on the first dataset and the second dataset, (i) an initial value of a first velocity of the object along a first axis orthogonal to the direction of the plurality of beams, (ii) an initial value of a second velocity of the object along a second axis orthogonal to the direction of the plurality of beams, and (iii) an initial value of a rotational velocity of the object about an axis parallel to the direction of the plurality of beams.

2. The method as in claim 1, wherein the plurality of beams of electromagnetic radiation of the scanning mechanism are arranged in a rectangular grid,
    wherein each of the plurality of beams of electromagnetic radiation of the scanning mechanism are emitted from a laser producing, as that beam, quasi-coherent optical radiation,
    wherein defining the first dataset includes obtaining, at the first time, values of displacements of the object along the axis parallel to the direction of the plurality of beams at sample points of the first dataset defined by the rectangular grid, the values of the displacements being determined by a relative optical path length of each beam reflected from a respective point on the object, and
    wherein defining the second dataset includes obtaining, at the second time, values of the displacements of the object along the axis parallel to the direction of the plurality of beams at sample points of the second dataset defined by the rectangular grid, the values of the displacements being determined by the relative optical path length of each beam reflected from a respective point on the object.

3. The method as in claim 2, wherein generating the initial values of the first velocity and the second velocity includes:
    resampling the first dataset to produce a first resampled dataset, the first resampled dataset being sampled in a rectangular grid of points, grid lines of the rectangular grid being parallel to either of the first axis or the second axis;
    resampling the second dataset to produce a second resampled dataset, the second resampled dataset being sampled in the rectangular grid of points;
    performing a motion estimation operation to estimate a motion estimate based on the first resampled dataset and the second resampled dataset; and
    after performing the motion estimation operation, producing the initial values of the first velocity and the second velocity based on the motion estimate.

4. The method as in claim 3, wherein resampling the first dataset includes performing a linear interpolation operation to produce sample points of the first resampled dataset and interpolated displacements of the object at the sample points of the first resampled dataset; and
    wherein resampling the second dataset includes performing the linear interpolation operation to produce sample points of the second resampled dataset and interpolated displacements of the object at the sample points of the second resampled dataset.

5. The method as in claim 4, wherein performing the linear interpolation operation includes:
    forming a rectangular region using four sample points of a dataset as vertices of the rectangular region, and
    generating an interpolated displacement of the object at a sample point within the rectangular region as a linear combination of displacements of the objects at the vertices of the rectangular region.

6. The method as in claim 4, wherein the sample points of the second resampled dataset are offset from the sample points of the first resampled dataset by a first translation along the first axis and a second translation along the second axis; and
    wherein performing the motion estimation operation includes finding, as the motion estimate, a first translation and a second translation that maximizes a correlation between the interpolated displacements of the object at the sample points of the first resampled dataset and the interpolated displacements of the object at the sample points of the second resampled dataset.

7. The method as in claim 6, wherein finding the first translation and the second translation includes generating, as the correlation between the interpolated displacements of the object at the sample points of the first resampled dataset and the interpolated displacements of the object at the sample points of the second resampled dataset, an inverse of a sum of squared differences between the interpolated displacements of the object at the sample points of the first resampled dataset and the interpolated displacements of the object at the sample points of the second resampled dataset.

8. The method as in claim 4, wherein generating the initial value of the rotational velocity of the object about the axis parallel to the direction of the plurality of beams includes:

creating an adjusted dataset from the first resampled dataset;

performing a rotational estimation operation to produce a rotational estimate based on the adjusted dataset; and after performing the rotational estimation operation, producing the initial value of the rotational velocity of the object about the axis parallel to the direction of the plurality of beams based on the rotational estimate.

9. The method as in claim 8, wherein creating the adjusted dataset from the first resampled dataset includes performing a linear interpolation operation to produce sample points and displacements of the object at the sample points of the adjusted dataset, the sample points of the adjusted dataset being based on the motion estimate.

10. The method as in claim 9, wherein the sample points of the adjusted dataset are offset from the sample points of the first resampled dataset by a rotation of the sample points of the first resampled dataset about the axis parallel to the direction of the plurality of beams; and wherein performing the rotational estimation operation includes finding, as the rotational estimate, a rotation that maximizes a correlation between the interpolated displacements of the object at the sample points of the first resampled dataset and the displacements of the object at the sample points of the adjusted dataset.

11. The method as in claim 10, wherein finding the rotation includes generating, as the correlation between the interpolated displacements of the object at the sample points of the first resampled dataset and the displacements of the object at the sample points of the adjusted dataset, an inverse of a sum of squared differences between the interpolated displacements of the object at the sample points of the first resampled dataset and the displacements of the object at the sample points of the adjusted dataset.

12. The method as in claim 2, further comprising, after generating the initial values of the first velocity, the second velocity, and the rotational velocity, producing a refined value of the first velocity, a refined value of the second velocity, and a refined value of the rotational velocity based on the initial value of the first velocity, the initial value of the second velocity, and the initial value of the rotational velocity.

13. The method as in claim 12, wherein producing the refined value of the first velocity, refined value of the second velocity, and the refined value of the rotational velocity includes:

generating refined sample points of the first dataset based on the initial value of the first velocity, the initial value of the second velocity, and the initial value of the rotational velocity to produce a first refined dataset;

generating refined sample points of the second dataset based on the initial value of the first velocity, the initial value of the second velocity, and the initial value of the rotational velocity to produce a second refined dataset;

resampling the first refined dataset to produce a first resampled refined dataset, the first resampled refined dataset being sampled in the rectangular grid of points and having a respective resampled value of the displacement at each point in the rectangular grid of points;

resampling the second refined dataset to produce a second resampled refined dataset, the second resampled dataset being sampled in the rectangular grid of points and having a respective resampled value of the displacement at each point in the rectangular grid of points;

finding a refined first translation, a refined second translation, and a refined rotation that maximizes a correlation between the resampled values of the displacement of the first resampled refined dataset and the resampled values of the displacement of the second resampled refined dataset; and producing the refined value of the first velocity, the refined value of the second velocity, and the refined value of the rotation based on the refined first translation, the refined second translation, and the refined rotation.

14. The method as in claim 13, wherein each refined sample point of the first dataset was collected at a respective instant of time different than the first time, and wherein generating the refined sample points of the first dataset includes, for each refined sample point of the first dataset:

producing a time difference equal to a difference between the instant of time at which that sample point was collected and the first time;

producing a first refinement of that sample point, the first refinement being based on a product of the time difference and each of a value of the first velocity and a value of the second velocity;

producing, as that refined sample point of the first dataset, a second refinement of that sample point, the second refinement being based on a rotation of the first refinement of that sample point over a rotation angle equal to a product of a value of the rotational velocity and the time difference.

15. The method as in claim 14, wherein the value of the first velocity is the initial value of the first velocity, the value of the second velocity is the initial value of the second velocity, and the value of the rotational velocity is the initial value of the rotational velocity.

16. The method as in claim 14, further comprising:

collecting values of the first velocity, values of the second velocity, and values of the rotational velocity at instants of time after the second time; and generating a first velocity profile in time based on the collected values of the first velocity, a second velocity profile in time based on the collected values of the second velocity, and a rotational velocity profile in time based on the collected values of the rotational velocity, and wherein the value of the first velocity is equal to the first velocity profile evaluated at the first time, the value of the second velocity is equal to the second velocity profile evaluated at the first time, and the value of the rotational velocity is equal to the rotational velocity profile evaluated at the first time.

17. A system, comprising:

a scanning mechanism configured and arranged to emit a plurality of beams of electromagnetic radiation in a direction and scan the plurality of beams over areas of an object in a direction substantially normal to the direction of the plurality of beams; and a computing device including memory and controlling circuitry coupled to the memory, the controlling circuitry being constructed and arranged to:

define a first dataset based on a performance of a first scan at a first time of an object using a plurality of beams of electromagnetic radiation emitted from a scanning mechanism;

define a second dataset based on a performance of a second scan at a second time of the object using the plurality of beams of electromagnetic radiation emitted from the scanning mechanism, each of the first scan and the second scan being performed in a direction substantially normal to a direction of the plurality of beams;

generate, based on the first dataset and the second dataset, (i) an initial value of a first velocity of the object along a first axis orthogonal to the direction of the beams, (ii) an initial value of a second velocity of the object along a second axis orthogonal to the direction of the beams, and (iii) an initial value of a rotational velocity of the object about an axis parallel to the direction of the beams.

18. The system as in claim 17, wherein the plurality of beams of electromagnetic radiation of the scanning mechanism are arranged in a rectangular grid, wherein each of the plurality of beams of electromagnetic radiation of the scanning mechanism are emitted from a laser producing, as that beam, quasi-coherent optical radiation, wherein the controlling circuitry constructed and arranged to define the first dataset is further constructed and arranged to obtain, at the first time, values of displacements of the object along the axis parallel to the direction of the plurality of beams at sample points defined by the rectangular grid, the values of the displacements being determined by a relative optical path length of each beam reflected from a respective point on the object, and wherein the controlling circuitry constructed and arranged to define the first dataset is further constructed and arranged to obtain, at the second time, values of the displacements of the object along the axis parallel to the direction of the plurality of beams at sample points defined by the rectangular grid, the values of the displacements being determined by the relative optical path length of each beam reflected from a respective point on the object.

19. The system as in claim 18, wherein the controlling circuitry constructed and arranged to generate the initial values of the first velocity and the second velocity is further constructed and arranged to:

resample the first dataset to produce a first resampled dataset, the first resampled dataset being sampled in a rectangular grid of points, grid lines of the rectangular grid being parallel to either of the first axis or the second axis;

resample the second dataset to produce a second resampled dataset, the second resampled dataset being sampled in the rectangular grid of points;

perform a motion estimation operation to estimate a motion estimate based on the first resampled dataset and the second resampled dataset; and after performing the motion estimation operation, produce the initial values of the first velocity and the second velocity based on the motion estimate.

20. The system as in claim 19, wherein the controlling circuitry constructed and arranged to resample the first dataset is further constructed and arranged to perform a linear interpolation operation to produce sample points of the first resampled dataset and interpolated displacements of the object at the sample points of the first resampled dataset; and wherein the controlling circuitry constructed and arranged to resample the second dataset is further constructed and arranged to perform the linear interpolation operation to produce sample points of the second resampled dataset and interpolated displacements of the object at the sample points of the second resampled dataset.

* * * * *